No. 630,361. Patented Aug. 8, 1899.
P. KLUMB.
REVOLVING CHAIR.
(Application filed Apr. 17, 1899.)

(No Model.)

Witnesses.

Inventor.
Paul Klumb
By Benedict Morsell
Attorneys.

UNITED STATES PATENT OFFICE.

PAUL KLUMB, OF SHEBOYGAN, WISCONSIN, ASSIGNOR TO THE PHILIP MEYER COMPANY, OF SAME PLACE.

REVOLVING CHAIR.

SPECIFICATION forming part of Letters Patent No. 630,361, dated August 8, 1899.

Application filed April 17, 1899. Serial No. 713,281. (No model.)

*To all whom it may concern:*

Be it known that I, PAUL KLUMB, of Sheboygan, in the county of Sheboygan and State of Wisconsin, have invented a new and useful Improvement in Revolving Chairs, of which the following is a description, reference being had to the accompanying drawings, which are a part of this specification.

My invention relates to improvements in that class of revolving chairs in which the revolving-chair seat is adapted to be raised and lowered by devices intimately related with the devices permitting of the revolution of the chair.

The invention consists of the devices, their parts, and combinations of parts, as herein described and claimed, or their equivalents.

Figure 1:
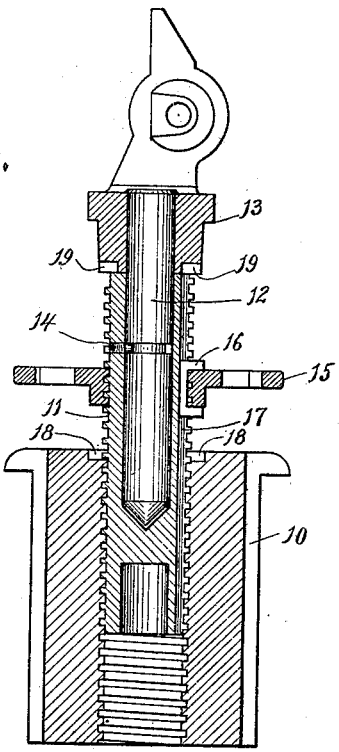
Figure 2:
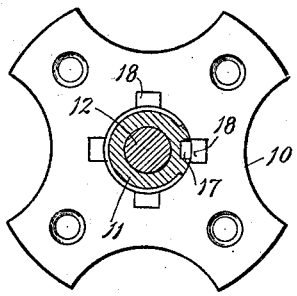
Figure 3:
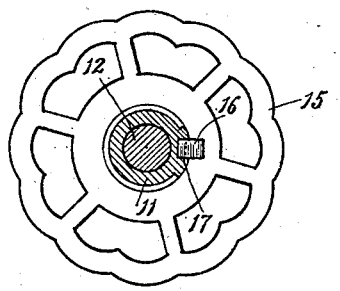
Figure 4:
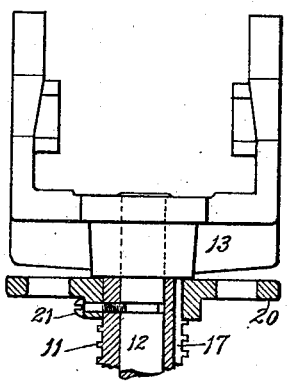

In the drawings, Figure 1 is a view of my improved devices in a revolving chair, the parts involving the invention being mostly shown in cross-section. Fig. 2 is a top plan view of the hub, the screw and spindle being shown in transverse section. Fig. 3 is a top plan view of the threaded hand-wheel or nut and related parts, the screw and spindle being shown in section. Fig. 4 shows a fragment of my improved devices, illustrating a modified form of the construction.

In the drawings, 10 represents a metal hub of a construction adapted to receive and hold therein the inner ends of the legs of the chair, which radiate therefrom and support this hub and its load at a distance above a floor. This thread is provided centrally with a vertical screw-threaded aperture, in which a thereto-fitted screw 11 turns. The upper end of this screw 11 is provided with a circular socket that extends from its upper end down a considerable distance into the screw and in which socket a cylindrical spindle 12 is fitted and is rotatable freely. The spindle 12 is provided with a head 13, to which the chair-seat can be secured and with which the seat is revoluble by means of the rotatability of the spindle 12 in the screw 11. A holding-screw 14, turning through the wall of the screw 11 into an annular channel therefor in the spindle 12, retains the spindle rotatably and releasably in the screw against endwise removal therefrom.

The chair-seat can be raised or lowered to a desired height by rotating the screw 11 in the hub 10. The chair-seat being thus raised or lowered to the desired height, it is important to lock the screw 11 against automatic rotation in the hub 10, or otherwise the screw would work down in the hub under the weight of a person in the chair, oscillating the chair-seat in one direction and then the other by reason of the friction of the head 13 and the spindle 12 on the screw. To provide for thus locking the screw 11 against automatic rotation, a screw-threaded hand-wheel or nut 15 is fitted and rotates by its screw-thread on the screw 11, and a key 16, fitted and movable freely in a longitudinal groove 17 in the screw 11, is also encircled with the screw by the nut 15, against which on its top and bottom the outwardly-projecting ends of the key bear loosely. By this construction the key 16, that travels in the groove 17 in the screw 11, is adapted to be moved up or down in the groove in which it is held movably by the nut. Sockets 18 in the top of the hub 10, adjacent to the central aperture, are adapted to receive the lower end of the key 16 therein, so that when the screw 11 has been adjusted to the desired position in the hub 10 the nut 15 is turned on the screw, carrying the key 16 down with it and taking the key into one of the sockets 18 in the hub, whereby the screw 11 is locked against rotation in the hub. When it is desired to raise or lower the chair-seat, the key 16 must be raised out of the socket 18 by turning the nut 15 on the screw, and the screw 11 can then be adjusted up or down.

To enable the user of the chair conveniently to turn the screw 11 up or down in the hub 10, the key 16 can be moved by turning the nut 15 upwardly until the key 16 enters one of the sockets 19 provided therefor in the head 13, and thereby the screw 11 will be locked to the head 13, and thereupon the screw can be readily turned in the hub 10 by revolving the chair-seat and therewith rotating the screw. The key 16 can then be moved into engagement with the hub 10, locking the screw against rotation.

In the modified form of device shown in Fig. 4 a hand-wheel 20 is secured rigidly to the upper extremity of the screw 11 by means of a holding-screw 21, and by means of this hand-wheel the screw 11 can be rotated in the hub 10, raising or lowering it therein, thus obviating the occasion for raising the key 16 into sockets 19, as provided for in the other form of construction, for the purpose of rotating the screw conveniently.

What I claim as my invention is—

1. The combination, with a chair-hub provided with a vertical screw-threaded aperture, of a screw turning by its thread therein said screw being provided with an exterior longitudinal groove, a nut turning on said screw above the hub, a key mounted on the nut and movable therewith up and down and fitted and movable vertically in said longitudinal groove in the screw, the nut being rotatable about the screw and the key, and means by which the key engages the hub releasably and prevents the rotation of the screw in the hub.

2. The combination with a chair-hub provided with a vertical screw-threaded aperture and means at its upper end for engaging a key, of a screw turning in the hub said screw being provided with an exterior longitudinal groove, a nut turning on said screw above the hub, a chair-iron head secured to and revoluble on the screw and provided with means for engaging a key, and a key fitted and movable in the groove in the screw and so connected to the nut turning on the screw as to be capable of being lowered or raised by the rotation thereof into locking engagement with said hub or said chair-iron head.

3. The combination with a chair-hub provided at its upper end with means for engaging a key, and a screw turning vertically in the hub, of a key slidable in the screw longitudinally thereof and adapted to engage the hub preventing rotation of the screw, and means connected with the key and acting on the screw for raising and lowering the key.

In testimony whereof I affix my signature in presence of two witnesses.

PAUL KLUMB.

Witnesses:
AUG. ORTMEIER,
WM. MEYER.